No. 883,578. PATENTED MAR. 31, 1908.
G. E. SHAW.
HARVESTER.
APPLICATION FILED JULY 19, 1906.
2 SHEETS—SHEET 1.
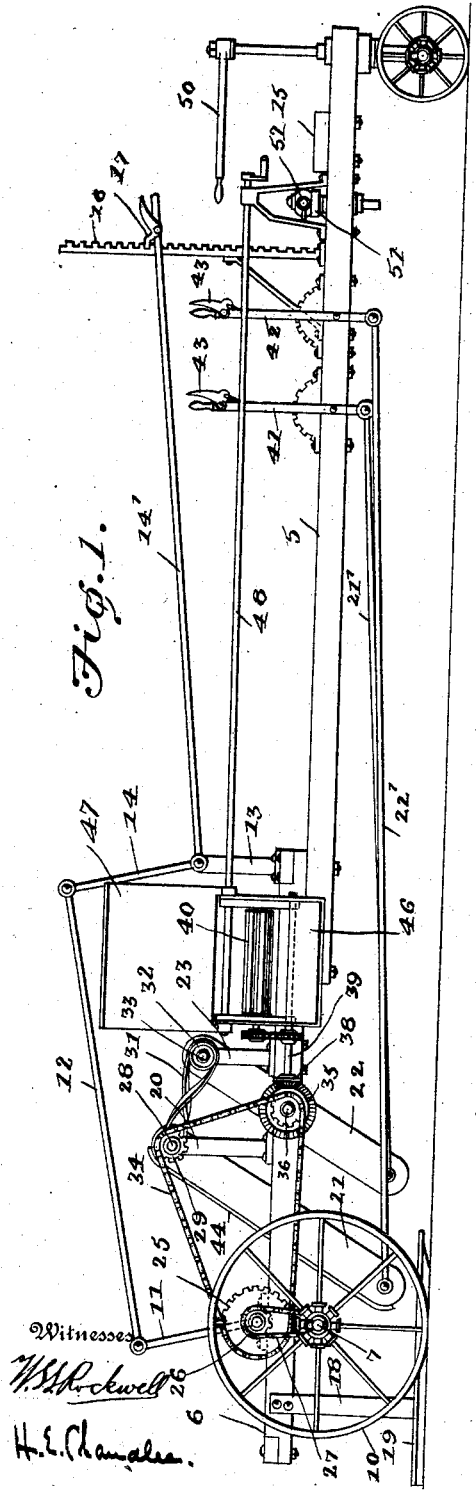
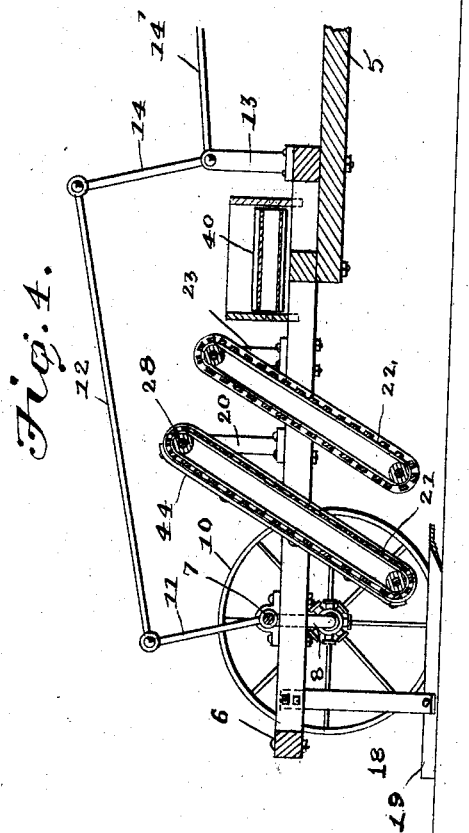
Witnesses
W. S. Rockwell
H. E. Chandler
Inventor
G. E. Shaw
By Chandler & Chandler
Attorneys
THE NORRIS PETERS CO., WASHINGTON, D. C.

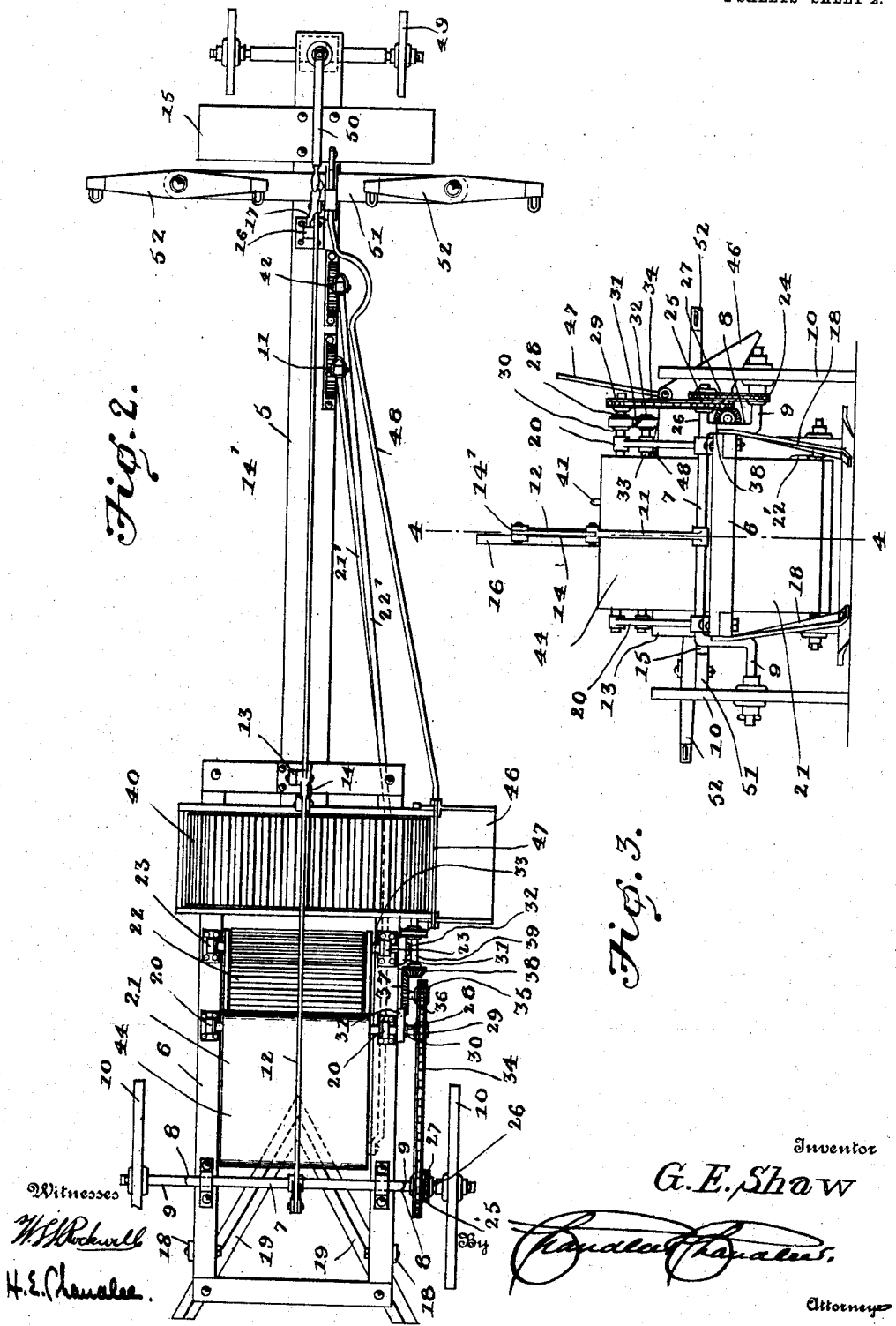

UNITED STATES PATENT OFFICE.

GEORGE E. SHAW, OF SHELDON, CALIFORNIA.

HARVESTER.

No. 883,578.        Specification of Letters Patent.        Patented March 31, 1908.

Application filed July 19, 1906. Serial No. 326,918.

*To all whom it may concern:*

Be it known that I, GEORGE E. SHAW, a citizen of the United States, residing at Sheldon, in the county of Sacramento, State of California, have invented certain new and useful Improvements in Harvesters; and I do hereby declare the following to be a full, clear, and exact description of the invention, such as will enable others skilled in the art to which it appertains to make and use the same.

This invention relates to harvesters and more particularly to bean harvesters, and has for its object to provide a machine of this kind which will include a novel arrangement of parts, which will be arranged to harvest beans, discharging them at the will of the operator.

Other objects and advantages will be apparent from the following description, and it is to be understood that I do not desire to be limited to the exact details of construction shown and described, for obvious modifications will occur to a person skilled in the art.

In the drawings forming a portion of this specification and in which like numerals of reference indicate similar parts in the several views, Figure 1 is a side elevation of the present invention. Fig. 2 is a top plan view. Fig. 3 is a front view. Fig. 4 is a longitudinal section on line 4—4 of Fig. 3.

Referring now to the drawings, the present invention comprises a central longitudinal beam 5, having a horizontal frame 6 secured to its forward end.

An axle 7 is journaled transversely upon the frame 6 and has its end portions turned downwardly at opposite sides of the frame, as shown at 8, outwardly extending spindles 9 being carried by the lower ends of the portions 8, upon which are revolubly mounted ground wheels 10. As will be readily seen, the axle 7 may be moved in its bearings to bring the wheels 10 into and out of engagement with the ground, and an upwardly extending arm 11 is carried by the axle and has connected thereto a rod 12 for movement of the arm. An upwardly extending standard 13 is secured to the rearward end of the frame 6, and pivoted upon this standard there is an angle lever 14, having a vertical arm to which the rod 12 is connected, and a horizontal arm extending rearwardly to a point within reach of a platform 15 mounted upon the rearward portion of the beam 5, this horizontal arm being shown at 14'. An upwardly extending rack bar 16 is secured to the beam 5, for engagement by a dog 17 carried by the arm 14', to hold the latter at different points of its movement, and it will be seen by means of this arrangement, the frame 6 may be raised and lowered with respect to the surface upon which the wheels 10 rest.

Depending supports 18 are carried by the frame at the forward portion thereof, and have rearwardly convergent horizontally disposed knives 19 secured thereto. Supports 20 are secured to the frame, and a downwardly and forwardly slanting elevating carrier 21 is connected at its upper end with the supports, its lower end lying forwardly of the rearward end of the knives 19, and a second elevating carrier 22 is mounted at its upper end upon supports 23 carried by the frame, and extends downwardly in parallel relation to the elevator 21 and rearwardly thereof.

A sprocket wheel 24 is carried by one of the wheels 10, and a double sprocket 25 is revolubly mounted upon a stub shaft 26 which extends outwardly from one end of the central portion of the axle 7 and a chain 27 connects sprocket 24 with one of the members of the sprocket 25.

The drive shaft of the elevator 21, is located at the upper end of this elevator, as shown at 28, and carries a sprocket wheel 29 and band wheel 30, this band wheel having a cross belt 31 engaged therewith, and with a second band wheel 32 carried by a drive shaft 33 of the elevator 22, which is located at the upper end thereof. A chain 34 is engaged with the sprocket 29 and with the other member of the sprocket 25 and is also engaged with the sprocket 35 mounted upon a stub shaft 36 which extends outwardly from the frame. The sprocket 35 also has secured thereto, a bevel gear 37 which meshes with a bevel pinion 38 carried by the drive shaft 39 of a transversely extending conveyer 40 mounted upon the frame 6 forwardly of the standard 13 and rearwardly of the elevator 22, in position to receive matter from between the two elevators.

The elevators 21 and 22 are movable upon their drive shafts, as will be readily understood, and have rearwardly extending rods 21' and 22' respectively, which are pivoted to hand levers 41 and 42 mounted upon the rearward portion of the beam 5 and within reach of the platform 15. Operation of these levers 41 and 42 will thus shift the positions of the lower ends of the elevators longitudinally of the machine, and the distance between the lower ends of the elevators may be varied through independent operation of the levers 41 and 42. Means 43 is provided to hold the levers at different points of their pivotal movement.

A shield 44 is provided for the forward side of the elevator 21, and the movable belt of this elevator has cross slats 45 as has also the belt of the elevator 22. The connection between the drive wheel and the elevator 21 is such that the rearward portion of this elevator moves upwardly, and by reason of the crossing of the belt 31, the forward portion of the elevator 22 is moved upwardly.

Matter cut between the knives 19 falls in position to be engaged by the slats of the elevator 21, by which it is carried between the elevators to be lifted thereby and discharged upon the conveyer 40, arranged to run toward one side of the machine, as shown.

A downwardly and outwardly inclined discharge plate 46 is located at the discharge end of the conveyer 40, and a gate 47 is pivoted for movement into and out of position to prevent the passage of matter from the plate 46. A trip mechanism 48 is connected with the gate 47 and is operable from the platform 15.

A rudder wheel 49 is pivoted at the rearward end of the beam 5 and is provided with a tiller 50.

A double tree 51 is pivoted upon the rearward portion of the beam 5 and carries swingletrees 52 at its ends, to which draft animals may be hitched.

It is to be understood that the present machine will be moved over the ground with its knives 19 at opposite sides of a row of beams or other growth to be cut, and that such cut matter will be transferred to the conveyer 40 from which it will enter the discharge pocket formed by the plate 46 and gate 47, to be released therefrom, through operation of the trip mechanism.

What is claimed is:

1. A machine of the class described comprising a pair of rearwardly converging horizontal knives, spaced elevators one behind the other inclined forwardly and downwardly and adapted to receive the matter therebetween from said knives, means for individually adjusting said elevators towards and from each other, means for retaining said elevators in adjusted position, and means for driving said elevators.

2. A machine of the class described comprising a frame, cutting mechanism carried thereby, spaced elevators one behind the other inclined forwardly and downwardly and connected at their upper ends with the frame for pivotal movements towards and away from each other, said elevators being adapted to receive matter from the cutting mechanism therebetween, means for driving the elevators, rods pivoted to the lower ends of the elevators, an operating lever connected with each rod, for moving the elevators pivotally, and means adapted for engagement with said levers, to hold the elevators in adjusted position.

3. A machine of the class described comprising a pair of rearwardly converging knives, spaced elevators one behind the other inclined forwardly and downwardly and adapted to receive matter therebetween from said knives, means for individually adjusting said elevators towards and away from each other, means for retaining said elevators in adjusted position, means for driving said elevators, a discharge conveyer disposed transversely of the frame adjacent the upper ends of said elevators and adapted to receive matter from said elevators, a downwardly inclined plate at the discharge end of the conveyer, a gate movable into and out of position to prevent the discharge of matter from said conveyer, means for operating said plate, and means for driving said conveyer.

4. A machine of the class described comprising a frame, cutting mechanism carried by the frame, coöperating elevators arranged to receive matter therebetween from the cutting mechanism, said elevators being pivoted at their upper ends for movement towards and away from each other, means for operating the elevators, and independent means for moving the elevators upon their pivots.

In testimony whereof, I affix my signature, in presence of two witnesses.

GEORGE E. SHAW.

Witnesses:
   A. E. BRIGGS,
   A. W. BAILEY.